US009894383B2

(12) United States Patent
Lin et al.

(10) Patent No.: US 9,894,383 B2
(45) Date of Patent: Feb. 13, 2018

(54) METHOD AND APPARATUS FOR MOTION INFORMATION PREDICTION AND INHERITANCE IN VIDEO CODING

(71) Applicant: HFI Innovation Inc., Zhubei, Hsinchu County (TW)

(72) Inventors: Jian-Liang Lin, Su'ao Township, Yilan County (TW); Yi-Wen Chen, Taichung (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 484 days.

(21) Appl. No.: 14/434,258

(22) PCT Filed: Oct. 8, 2013

(86) PCT No.: PCT/CN2013/084839
§ 371 (c)(1),
(2) Date: Apr. 8, 2015

(87) PCT Pub. No.: WO2014/056423
PCT Pub. Date: Apr. 17, 2014

(65) Prior Publication Data
US 2015/0296222 A1    Oct. 15, 2015

Related U.S. Application Data

(60) Provisional application No. 61/711,328, filed on Oct. 9, 2012.

(51) Int. Cl.
*H04N 19/597* (2014.01)
*H04N 19/52* (2014.01)
(Continued)

(52) U.S. Cl.
CPC ........... *H04N 19/597* (2014.11); *H04N 19/30* (2014.11); *H04N 19/34* (2014.11); *H04N 19/52* (2014.11)

(58) Field of Classification Search
CPC ....... H04N 19/597; H04N 19/34; H04N 19/52
See application file for complete search history.

(56) References Cited

U.S. PATENT DOCUMENTS

2008/0159638 A1    7/2008    Song et al.
2011/0110428 A1    5/2011    Chang et al.
(Continued)

FOREIGN PATENT DOCUMENTS

CN    101119493    2/2008
CN    101917619    12/2010
(Continued)

OTHER PUBLICATIONS

Lin, J.L., et al.; "Non-CE9 Simplified AMVP derivation for Inter Mode;" Joint Collaborative Team on Video Coding (JCT-VC) of ITU-T SG16 WP3 and ISO/IEC JTC1/SC29/WG11; Nov. 2011; pp. 1-4.
Lange, R.; "Extended inter-layer motion vectors prediction in scalable video coding;" International Organisation for Standardisation; Jan. 2006;pp. 1-18.
Lange, R., et al.; "Response to SVC CE2 task inter-layer motion information prediction;" International Organisation for Standardisation; Jul. 2004; pp. 1-6.
(Continued)

*Primary Examiner* — Shawn An
(74) *Attorney, Agent, or Firm* — McClure, Qualey & Rodack, LLP

(57) ABSTRACT

Embodiments of the present invention re-use at least a portion of motion information of the corresponding block for the motion information of the current block if a corresponding reference picture corresponding to a reference picture pointed by the corresponding block is in a current reference picture list of the current block. If the corresponding reference picture is not in the current reference picture list of the current block, the motion information of the current block is determined using an alternative process, where at least a portion of the motion information, which was used in the previous case, is not re-used for the current block according to the alternative process.

24 Claims, 6 Drawing Sheets

(51) Int. Cl.
*H04N 19/30* (2014.01)
*H04N 19/34* (2014.01)

(56) References Cited

U.S. PATENT DOCUMENTS

| | | |
|---|---|---|
| 2012/0128060 A1 | 5/2012 | Lin et al. |
| 2012/0195368 A1 | 8/2012 | Chien et al. |
| 2012/0224634 A1 | 9/2012 | Yamori |
| 2012/0269270 A1* | 10/2012 | Chen .................... H04N 19/597 375/240.16 |
| 2013/0243092 A1* | 9/2013 | Sugio .................... H04N 19/52 375/240.16 |
| 2013/0336406 A1* | 12/2013 | Zhang ............. H04N 19/00763 375/240.16 |

FOREIGN PATENT DOCUMENTS

| | | |
|---|---|---|
| WO | WO 2008/108566 | 9/2008 |
| WO | WO 2012/122786 | 9/2012 |

OTHER PUBLICATIONS

Zhang, K.Z., et al,; "3D-CE5.h related Improvement on MV candidates for 3DVC;" Joint Collaborative Team on 3D Video Coding Extension Development of ITU-T SG 16 WP 3 and ISO/IEC JTC 1/SC 29/WG 11; Oct. 2012; pp. 1-12.

International Search Report dated Jan. 9, 2014, issued in PCT/CN2013/084839.

* cited by examiner

METHOD AND APPARATUS FOR MOTION INFORMATION PREDICTION AND INHERITANCE IN VIDEO CODING

CROSS REFERENCE TO RELATED APPLICATIONS

The present invention is a National Stage application of PCT Application Ser. No. PCT/CN2013/084839, filed Oct. 8, 2013, which claims priority to U.S. Provisional Patent Application, Ser. No. 61/711,328, filed on Oct. 9, 2012, entitled "Information Prediction/Inheritance in Video Coding". The priority applications are hereby incorporated by reference in their entirety.

TECHNICAL FIELD

The present invention relates to three-dimensional, multi-dimensional and scalable video coding. In particular, the present invention relates to video coding using motion information associated with a reference view, a reference layer or other component.

BACKGROUND

Three-dimensional (3D) television has been a technology trend in recent years that intends to bring viewers sensational viewing experience. Various technologies have been developed to enable 3D viewing. The multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism. 3D video formats may also include depth maps associated with corresponding texture pictures. The depth maps also have to be coded to rendering three-dimensional view or multi-view.

Various techniques to improve the coding efficiency of 3D video coding have been disclosed in the field. There are also development activities to standardize the coding techniques. For example, a working group, ISO/IEC JTC1/SC29/WG11 within ISO (International Organization for Standardization) is developing an HEVC (High Efficiency Video Coding) based 3D video coding standard (named 3D-HEVC). To reduce the inter-view redundancy, a technique, called disparity-compensated prediction (DCP) has been added as an alternative coding tool to motion-compensated prediction (MCP). MCP is also referred as Inter picture prediction that uses previously coded pictures of the same view in a different access unit (AU), while DCP refers to an Inter picture prediction that uses already coded pictures of other views in the same access unit, as shown in FIG. 1. The vector used for DCP is termed as disparity vector (DV), which is analog to the motion vector (MV) used in MCP. The video pictures (110A) and depth maps (110B) corresponding to a particular camera position are indicated by a view identifier (viewID). For example, video pictures and depth maps associated with three views (i.e., V0, V1 and V2) are shown in FIG. 1. All video pictures and depth maps that belong to the same camera position are associated with the same viewID. The video pictures and, when present, the depth maps are coded access unit by access unit, as shown in FIG. 1. An AU (120) includes all video pictures and depth maps corresponding to the same time instant. The motion data compression is performed for each picture after all the pictures (both texture and depth) within the same AU are coded. In this case, for each AU, the reconstruction process for pictures within the AU can rely on full-resolution motion data associated with the current AU. The motion data compression will only affect the reconstruction process of other Ails that refer the compressed motion data associated with the current AU.

In 3D-HEVC version 4.0, Inter mode, Merge and Skip mode are used for texture and depth coding. In 3D-HEVC, a hybrid block-based motion-compensated DCT-like transform coding architecture is utilized. The basic unit for compression, termed as coding unit (CU), is a 2N×2N square block. Each CU can be recursively split into four smaller CUs until a pre-defined minimum size is reached. Each CU contains one or multiple prediction units (PUs). The PU size can be 2N×2N, 2N×N, N×2N, or N×N. When asymmetric motion partition (AMP) is supported, the PU size can also be 2N×nU, 2N×nD, nL×2N or nR×2N. To share the previously encoded motion information of reference views, the inter-view motion prediction is employed. For deriving candidate motion parameters for a current block in a dependent view, a DV for current block is firstly derived, and then the prediction block in the already coded picture in the reference view is located by adding the DV to the location of current block. If the prediction block is coded using MCP, the associated motion parameters can be used as candidate motion parameters for the current block in the current view. The derived DV can also be directly used as a candidate DV for DCP.

In order to enable efficient encoding of the depth map data, in HTM-4.0, a new coding mode, named motion parameter inheritance (MPI), that allows inheritance of the treeblock subdivision into CUs and PUs and their corresponding motion parameters from the texture data has been introduced. Since the motion vectors of the video signal have quarter-sample accuracy, whereas for the depth map signal only full-sample accuracy is used, in the inheritance process the motion vectors are quantized to their nearest full-sample position. It can be adaptively decided for each block of the depth map, whether the motion data is inherited from the collocated block of the video signal or if new motion data are transmitted. For signaling the MPI coding mode, the Merge/Skip mode syntax is used. The list of possible Merge candidates has been extended in a way that, for depth map coding, the first Merge candidate refers to enabling the MPI coding mode to inherent motion and CU/PU splitting structure from the associated video signal. Since the motion data along with the CU/PU splitting structure of the texture is re-used by the depth, the MPI scheme introduces additional buffer to store the inter-dir (used to indicate the prediction direction) and split flag (used to indicate the data splitting) information.

FIG. 2 illustrates an example of MPI for depth coding in 3D-HEVC. Texture picture 212 corresponds to a current picture and texture picture 210 corresponds to a picture at a reference time instance. Both texture pictures 210 and 212 are in the same view. Block 250 (e.g., a PUCU as indicated by a thick lined box) in current picture 212 is partitioned into four sub-blocks. Motion vectors 232 and 234 are associated with sub-blocks 252 and 254. Depth block 260 is collocated with texture block 250 and may inherit motion parameters from texture block 250. Accordingly, sub-blocks 262 and 264 may inherit motion parameters (e.g., motion vectors 232' and 234') from respective sub-blocks 252 and 254. Block 270 in current picture 212 is partitioned into four sub-blocks. Motion vector 236 is associated with sub-block 272. Depth block 280 is collocated with texture block 270. Depth sub-block 282 does not inherit motion information from texture collocated sub-block. In this case, a separate motion vector 246 is transmitted for the corresponding depth sub-block 282. For signaling the MPI coding mode, the Merge/Skip mode syntax is used. The list of possible Merge candidates has been extended for depth map coding so that the first Merge candidate refers to using of MPI coding mode, i.e., inheriting motion parameters and CU/PU structure of the corresponding block of the associated video signal in this case.

The MPI mode can be used in any level of the hierarchical coding-tree block of the depth map. If the MPI mode is indicated at a higher level of the depth map coding tree, the depth data in this higher level unit can inherit the CU/PU subdivision as well as the corresponding motion data from the video signal. This higher level unit may be larger than the CU size for the video signal. Accordingly, it is possible to specify MPI mode for a whole tree-block, typically corresponding to 64×64 image samples, and the whole tree-block of the depth map is partitioned into CUs and PUs by inheriting the CU and PU partitioning of the corresponding block of the video signal. If the MPI mode is indicated at a level of the coding tree that is smaller than or the same size as the corresponding CU size of the video signal, only the motion data are inherited from the video signal. When the MPI mode is used, not only the partitioning and the motion vectors, but also the reference picture indices are inherited from the video signal. Therefore, it has to be ensured that the depth maps corresponding to the video reference pictures are also available in the reference picture buffer for the depth signal.

When the texture merging candidate is selected to code a depth block, the motion information of the depth block (312) in a depth map (310) re-uses or derives the motion information of a texture collocated block (322) of a texture picture (320) as shown in FIG. 3. The texture collocated block (322) may contain multiple sets of motion information. The motion information of the texture collocated block (322) may be selected from any location (or can be called sub-block) within or neighboring to the texture collocated block (322). For example, the location may correspond to a sub-block located at a lower right location of a center point of the texture collocated block (322). Nevertheless, other sub-blocks such as upper-left, upper-right or lower-left sub-block may also be used. The motion information may include motion vector, reference picture index and reference list. The texture merging candidate can be placed in any position of the merging candidate list. For example, if the texture merging candidate is available, it can be placed in the first position before the candidate corresponding to the left spatial neighboring block.

In 3D-HEVC version 4.0, inter-view motion vector prediction (MVP) is applied for the Merge/Skip mode. In the Merge/Skip mode, the same motion parameters as for a neighboring block are used. If a block is coded in Merge/Skip mode, a candidate list of motion parameters is derived, which includes the motion parameters of spatially neighboring blocks as well as motion parameters that are calculated based on the motion parameters of the co-located block in a temporal reference picture. The chosen motion parameters are signaled by transmitting an index in the candidate list. For the derivation of the inter-view motion compensated and the inter-view motion disparity compensated candidate, a corresponding block in a view component at the same time instant as the current view component is utilized. The corresponding block is determined by shifting the position of the current block using the disparity vector derived.

FIG. 4 illustrates an example of inter-view candidate derivation based on 3D-HEVC version 4.0. Block 420 represents a current block in a view (i.e., V1 in FIG. 4) and the corresponding block (410) in the base view (i.e., V0) can be located according to disparity associated with the current block. The corresponding block (410) has an MV (412) pointing to an inter-view block in list0 refidx0 of V0 in this example. If the collocated reference ColRef (i.e., L0 Ref0 of V0) is also in list0 of current block, the MV (422) for block 420 can re-use motion information from V0 as inter-view candidate of L0 for V1. The same derivation is applied to L1 refidx1 of V0. Similarly, the MV (414) associated with list1 refidx1 of V0 can be re-used for V1 as inter-view candidate MV (424).

Advanced residual prediction (ARP) based on Inter-view residual prediction is another tool offered by 3D-HEVC version 4.0. Relationship among current block, reference block and motion compensated block according to ARP are illustrated in FIG. 5. A disparity vector (516) is determined first for the current block (520) in view Vm to point to corresponding block in a target reference view (i.e., V0). The corresponding block (510) in the picture of the reference view within the same access unit is then located by the disparity vector. The motion information of the current block is re-used to derive the motion information for the reference block. For example, current block 520 has motion vector 522 pointing to list0 refidx0 in V1. The motion information can be reused by the corresponding block (510). Motion compensation can be applied to the corresponding block (510) based on the same motion vector (i.e., 522) of current block and derived reference picture in the reference view for the reference block, to derive residue block 512. The reference picture in the reference view (V0) which has the same POC (Picture Order Count) value as the reference picture in the current view (Vm) is selected as the reference picture of the corresponding block to form a residue block. A weighting factor is then applied to the residue block to obtain a weighted residue block and the weighted residue block is added to the predicted samples. Similar process can be applied for motion vector 524 pointing to a reference picture in list1 of V1 to obtain residue block 514.

FIG. 6 illustrates an exemplary prediction structure of residual prediction. Block 610 represents the current block in the current view (i.e., view 1), block 620 and block 630 denote the representation of current block 610 in the reference view (view 0) at time Tj and temporal prediction of current block 610 from the same view (view 1) at time Ti respectively. Motion vector 650 denotes the motion from current block 610 to block 630 at time Ti from the same view. Since current block 610 in view 1 and corresponding block 620 in view 0 are actually projections of the same object in two different views, these two blocks should share the same motion information. Therefore, temporal prediction block 640 in view 0 at time Ti of corresponding block 620 in view 0 at time Tj can be located from corresponding block 620 in view 0 by applying the motion information of motion vector 650. The residue (i.e., 640) of corresponding block 620 is then multiplied by a weighting factor and is used as along with the corresponding block (i.e., 620) to form the predictor for current block (i.e., 610).

Besides 3D video coding and multi-view video coding, motion information prediction and inheritance is also used in scalable video coding system. The joint video team (JVT) of ISO/IEC MPEG and ITU-T VCEG has standardized a Scalable Video Coding (SVC) extension of the H.264/AVC standard. SVC provides temporal, spatial, and quality scalabilities in a single bitstream. The SVC scalable bitstream contains the video information from low frame-rate, low resolution, and low quality videos to high frame rate, high definition, and high quality videos. This single bitstream can be adapted to various transmission environments and applications to deliver video at selected spatial/temporal resolution and video quality.

In SVC, three types of scalabilities, i.e., temporal scalability, spatial scalability, and quality scalability are provided. SVC uses the multi-layer coding structure to realize three dimensions of scalability. The concept of SVC is to generate one scalable bitstream that can be easily and rapidly adapted without transcoding or re-encoding to fit the bit-rate of various transmission channels, diverse display capabilities, and different computational resources. An important feature of SVC design is that the scalability is provided at a bitstream level. Bitstreams for a reduced spatial and/or temporal resolution can be simply obtained by discarding NAL units (or network packets) from a scalable bitstream that are not required for decoding the target resolution. NAL units for quality refinement can be additionally truncated in order to reduce the bit-rate and the associated video quality.

To share the previously encoded motion information of reference layers, the inter-layer motion prediction is employed. For example, motion parameter derivation for a current block in an enhancement layer may use the motion parameter of a collocated prediction block in previously coded picture in the reference layer.

In the motion information prediction/inheritance processes mentioned above, it is always assumed that the reference picture index is in the current reference picture list or the picture order count (POC) of the reference picture of the reference block in the picture used to derive motion parameter is in the current reference picture list. However, the reference picture index or the picture order count (POC) of the reference picture of the reference block in the picture used to derive motion parameter may not in the current reference picture list. In this case, the predicted or inherited motion parameters will be invalid. It is desirable to overcome this issue.

SUMMARY

A method and apparatus for motion information prediction and inheritance in a three-dimensional, multi-view or scalable video coding system are disclosed. The method or apparatus first receives input data associated with a current block of a current picture in a given view, component (texture or depth) or layer, and identifies a corresponding block in a corresponding picture in a reference view, component or layer. Embodiments of the present invention re-use at least a portion of motion information of the corresponding block for the motion information of the current block if a corresponding reference picture corresponding to a reference picture pointed by the corresponding block is in a current reference picture list of the current block. If the corresponding reference picture is not in the current reference picture list of the current block, the motion information of the current block is determined using an alternative process, where at least a portion of the motion information, which was used in the previous case, is not re-used for the current block according to the alternative process. The motion information of the corresponding block that can be re-used for the case of the corresponding reference picture in the current reference picture list may comprise a motion vector, reference picture index, or prediction direction of the corresponding block, or any combination thereof. In one embodiment, the motion information of the corresponding block to be re-used comprises a motion vector, reference picture index and prediction direction of the corresponding block. In another embodiment, the motion information of the corresponding block that can be re-used for the case of the corresponding reference picture in the current reference picture list only includes the motion vector of the corresponding block, and reference picture index of the current block is inferred or pre-defined, or is signaled in a bitstream.

One aspect of the present invention addresses various alternative processes. In one example, the alternative process sets the motion information of the current block as unavailable in a prediction direction if the corresponding reference picture is not in the current reference picture list of the current block in the prediction direction. If the current block is in a B slice and the corresponding reference picture is available in the current reference picture list of the current block only for one prediction direction, the alternative process sets the motion information of the current block to said one prediction direction. If the current block is in the B slice and the corresponding reference picture is not in the current reference picture list of the current block in both prediction directions (L0 and L1), the alternative process sets the motion information of the current block as unavailable for both the prediction directions. The motion vector of the corresponding block can be scaled to a scaled motion vector according to a POC distance between the current picture and a target reference picture and a POC distance between the corresponding picture and the reference picture. The alternative process can then use the scaled motion vector for the current block. In another example, the target reference picture corresponds to the first reference picture in the current reference picture list in a prediction direction, and the reference picture index of the current block is set to 0. The target reference picture may also set to the reference picture of a spatial neighboring block of the current block and the reference picture index of the current block is set to the reference picture index of the spatial neighboring block. In yet another example, the target reference picture is identified by reference picture index of the current block and the reference picture index of the current block is signaled in the bitstream, or the reference picture index of the current block is inferred or pre-defined.

The alternative process may also set the motion information of the current block to pre-defined parameters. For example, the motion vector of the current block can be set to (0,0) and reference picture index of the current block can be set to 0 in a prediction direction. When motion parameter inheritance (MPI) is enabled for the three-dimensional video coding system, the alternative process may set motion vector of the current block to (0,0), set reference picture index of the current block to 0, and set prediction direction of the current block to first prediction direction indicated by slice type if the motion information of the corresponding block is undefined or unclear.

The corresponding reference picture and the reference picture pointed by the corresponding block are pictures taken at the same time instance, for example, these two pictures have the same picture order count (POC). In another embodiment, the corresponding reference picture and the reference picture pointed by the corresponding block may have the same view index or layer index.

For advanced residual prediction (ARP) based on Inter-view residual prediction, embodiments of the present invention re-use at least a portion of first motion information of the current block for second motion information of the corresponding block if a corresponding reference picture corresponding to a reference picture pointed by the current block is in a corresponding reference picture list of the corresponding block. If the corresponding reference picture is not in the corresponding reference picture list of the corresponding block, third motion information of the corresponding block is determined. The second or third motion information is used in residual prediction according to whether the corresponding reference picture is in the corresponding reference picture list of the corresponding block. In this case, corresponding reference picture may have the same picture order count (POC) as the reference picture pointed by the current block.

DETAILED DESCRIPTION

Figure 1:
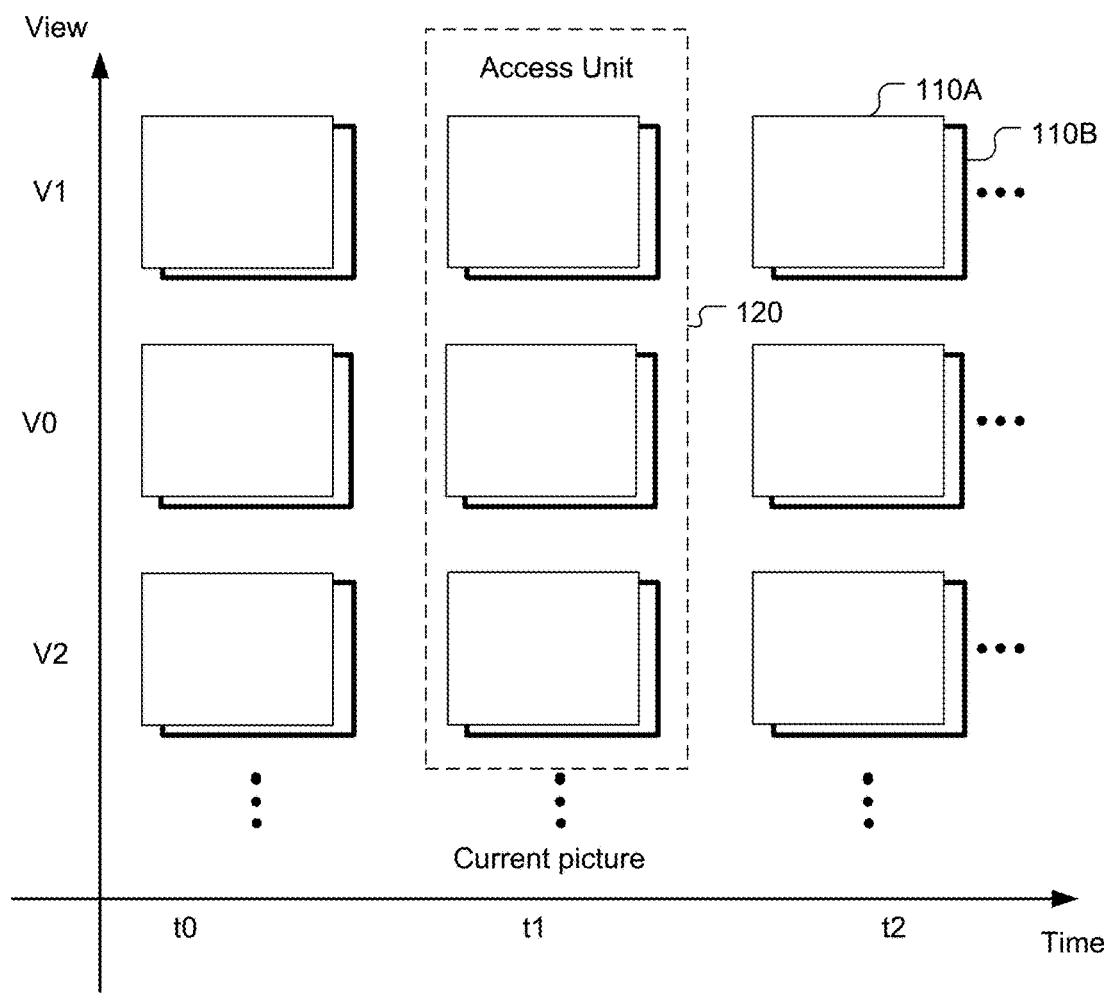
FIG. 1 illustrates an example of coding structure for a three-dimensional video coding system based on motion compensated prediction (MCP) and disparity compensated prediction (DCP), where texture and depth pictures in a same time instance are grouped into one access unit (AU).
Figure 2:
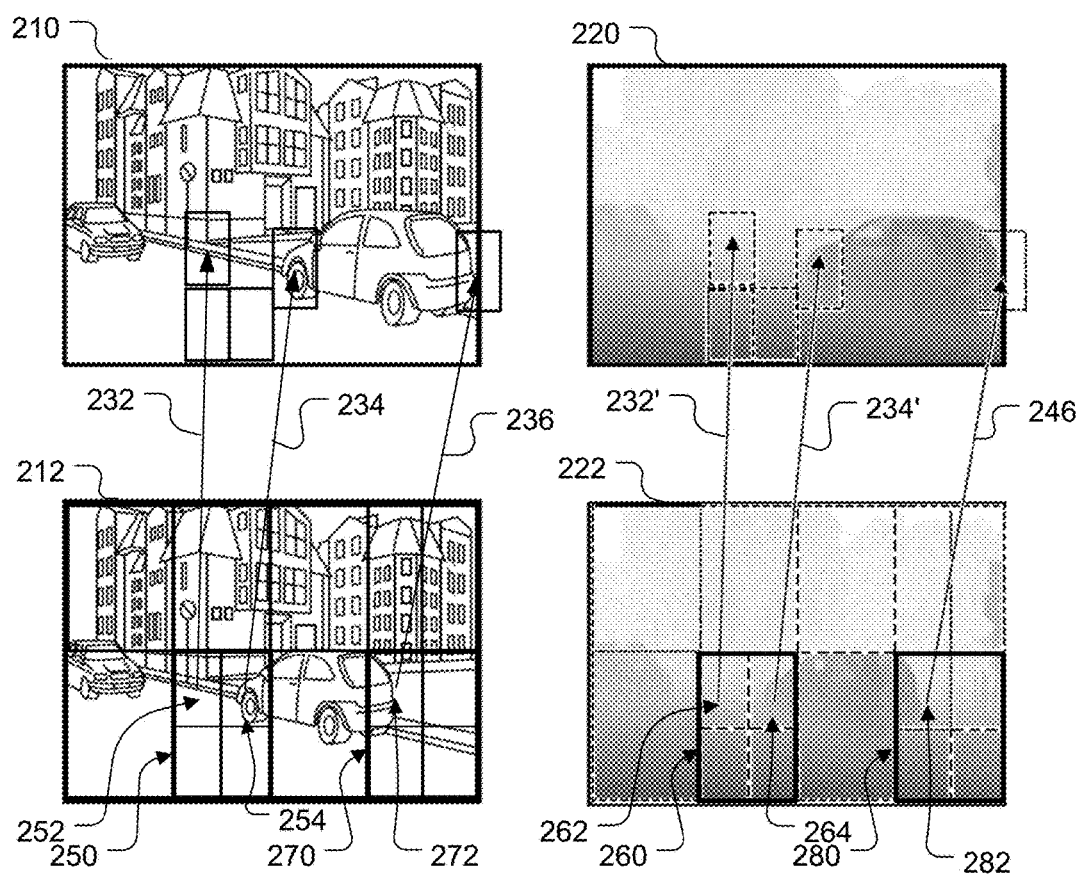
FIG. 2 illustrates an example of motion parameter inheritance as adopted in high efficiency video coding (HEVC) based Test Model version 4.0 (HTM-4.0).
Figure 3:
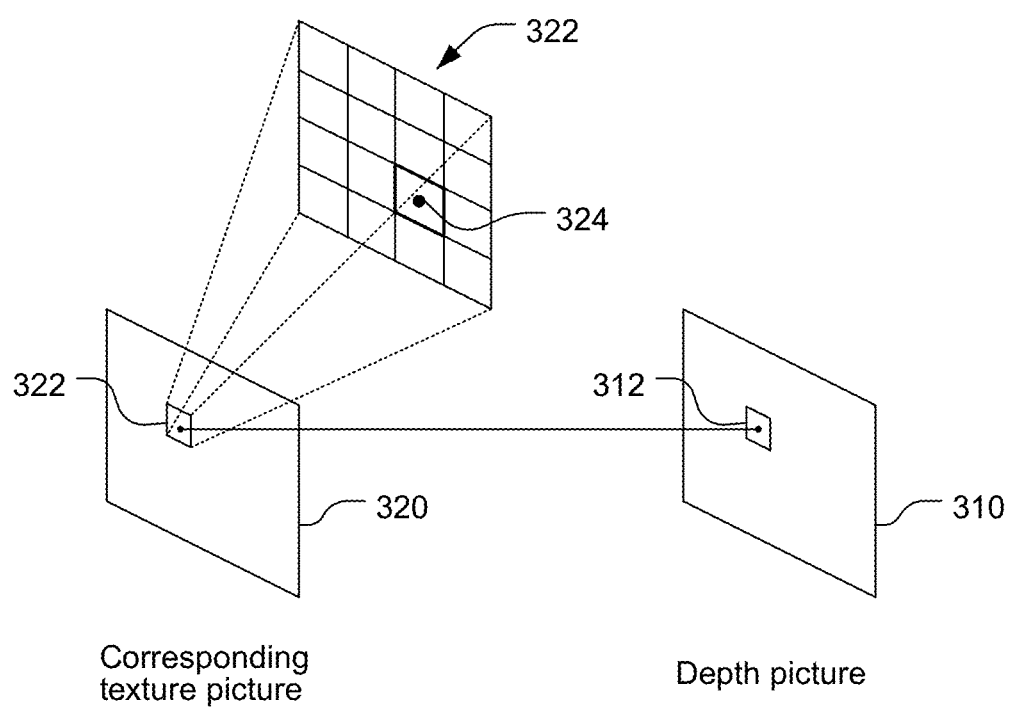
FIG. 3 illustrates an example that motion information from a texture collocated block is re-used by a corresponding depth block.
Figure 4:
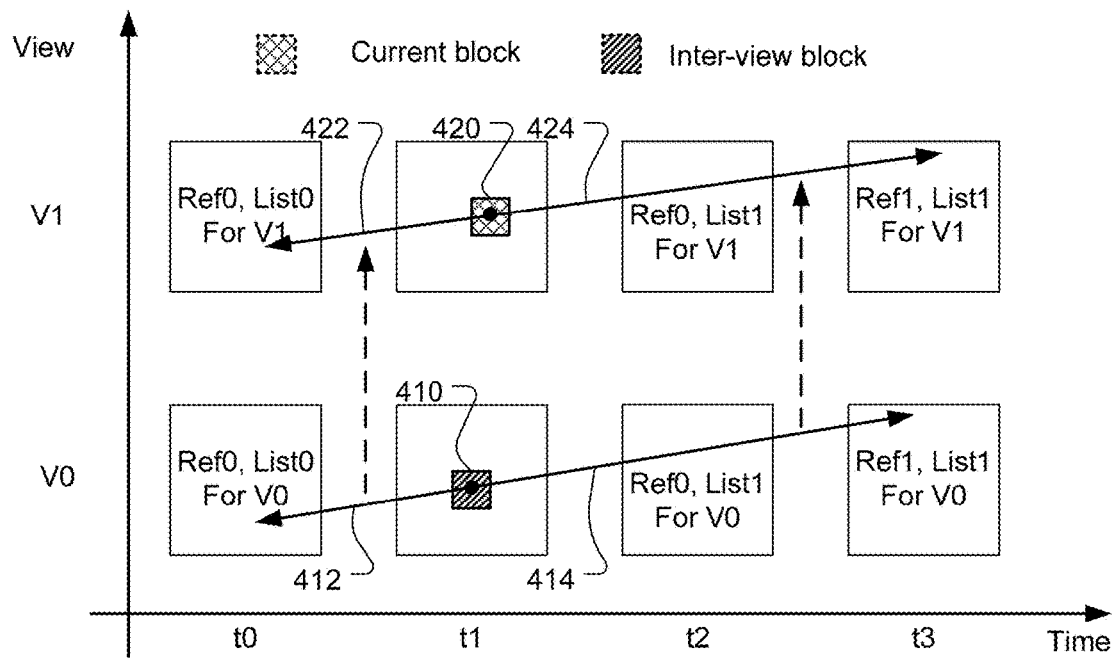
FIG. 4 illustrates an example of temporal inter-view Merge candidate derivation according to high efficiency video coding (HEVC) based Test Model version 4.0 (HTM-4.0).
Figure 5:
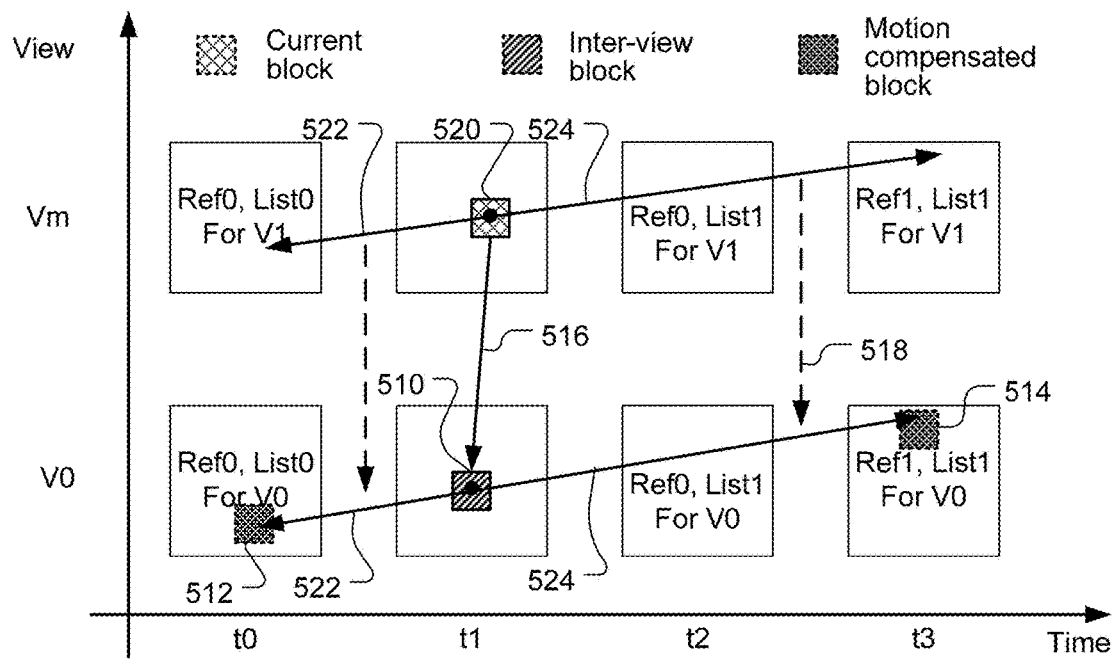
FIG. 5 illustrates the relation among current block, reference block, and motion compensated block in advanced residual prediction (ARP) according to high efficiency video coding (HEVC) based Test Model version 4.0 (HTM-4.0).
Figure 6:
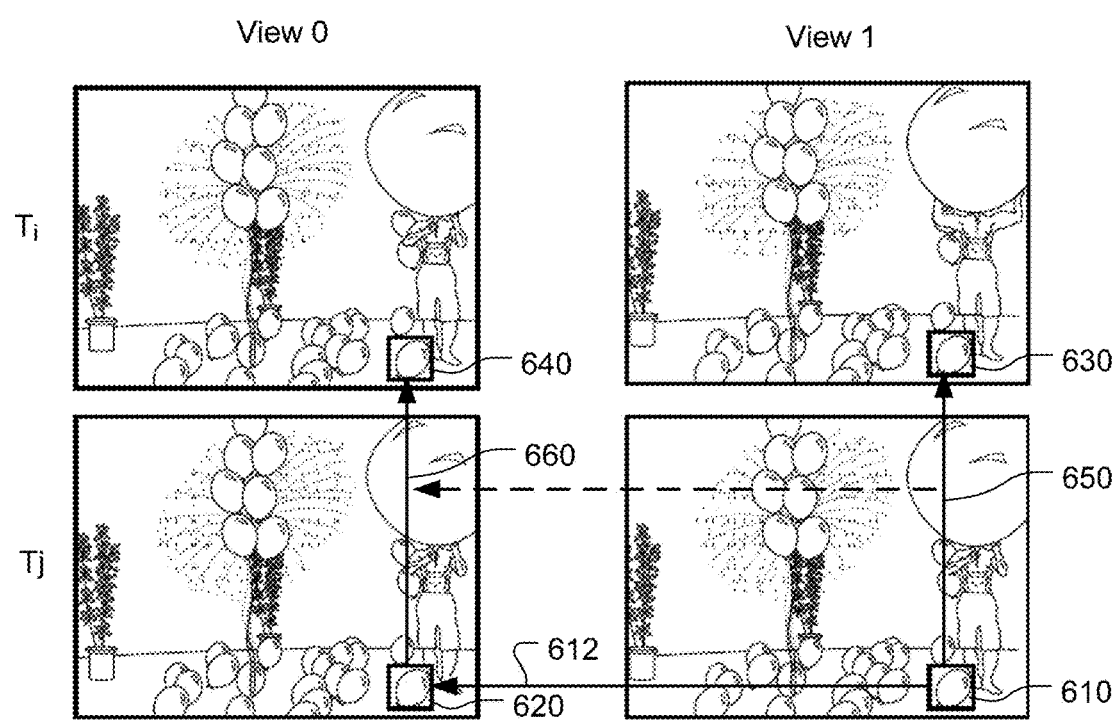
FIG. 6 illustrates an exemplary structure of advanced residual prediction (ARP) according to high efficiency video coding (HEVC) based Test Model version 4.0 (HTM-4.0).

In the motion information prediction/inheritance processes mentioned above, it is always assumed that the reference picture index is in the current reference picture list or the picture order count (POC) of the reference picture pointed by the corresponding block in the corresponding picture is in the current reference picture list, where the corresponding block is used to derive the motion parameters. However, the reference picture index or the picture order count (POC) of the reference picture pointed by the corresponding block may not be in the current reference picture list. In this case, the predicted or inherited motion parameters will be invalid. Accordingly, the present invention incorporates various embodiments to overcome the reference picture index issue associated with motion parameter prediction or inheritance for the inter-view, inter-component and inter-layer motion parameter prediction/inheritance. The inter-component prediction refers to prediction for one component based on another component. For example, the depth component can be used to derive prediction for the texture component, or vice versa.

In the first Embodiment, the motion parameters, such as motion vector (MV), reference picture index, prediction direction (L0, L1 or Bi-prediction) are all re-used. In this case, when the picture order count (POC) of the reference picture of the corresponding block in the corresponding picture used to derive motion parameter does not match any reference picture index in the current reference picture list of the prediction direction (list0 or list1) of the current block, or when the POC of the reference picture of the current block used to derive motion parameter does not match any reference picture index in the corresponding reference picture list of the corresponding block, an exception handler process can be used to overcome the reference picture index issue.

Exception Handler Process 1.

The motion parameter is set as unavailable in the prediction direction (list0 or list1). When the current slice is a B slice, if only the motion parameter of one list is available, the prediction direction for current block is set to L0 or L1 according to which one is available. Otherwise, if the motion parameters of both lists are unavailable, the motion predictor is set as unavailable.

Exception Handler Process 2.

The MV of the reference block is scaled according to the POC distance between the current picture and a target reference picture and the POC distance between the corresponding picture used to derive motion parameter and the reference picture. The target reference picture can be the first reference picture of the reference picture list of the prediction direction (list0 or list1) and the reference picture index for the current block can be set to 0. For advanced residual prediction (ARP), the MV of the current block is scaled according to the POC distance between the current picture and the reference picture and the POC distance between the corresponding picture and a target reference picture. The target reference picture can be the first reference picture of the reference picture list and the reference picture index for the corresponding block can be set to 0. The target reference picture may also be set to any reference picture in the reference picture list or the reference picture index.

Exception Handler Process 3.

The MV of the reference block is scaled according to the POC distance between the current picture and the target reference picture and the POC distance between the corresponding picture used to derive motion parameter and the reference picture. The target reference picture is set as the one used by a spatial neighboring block in the prediction direction (list0 or list1) and the reference picture index for the current block is set to that used by the spatial neighboring block.

Exception Handler Process 4.

The motion parameters are set to pre-defined parameters. For example, the pre-defined MV can be set to (0,0) and the pre-defined reference picture index can be set to 0 in the prediction direction (list0 or list1).

Exception Handler Process 5.

The motion vector is set to (0,0), reference picture index is set to 0, and the prediction type (uni-prediction or bi-prediction) is set to the slice type.

In the second Embodiment, only the motion vector (MV) is reused and the reference picture index is signaled in the bitstream. In this case, when the picture order count (POC) of the reference picture of the corresponding block in the corresponding picture used to derive motion parameter does not match any reference picture index in the reference picture list of the prediction direction (list0 or list1) of the current block, or when the POC of the reference picture of the current block used to derive motion parameter does not match any reference picture index in the corresponding reference picture list of the corresponding block, an exception handler process can be used to overcome the reference picture index issue.

Exception Handler Process 1.

The motion parameter is set as unavailable in the prediction direction (list0 or list1).

Exception Handler Process 2.

The MV of the corresponding block is scaled according to the POC distance between the current picture and a target reference picture and the POC distance between the corresponding picture used to derive motion parameter and the reference picture. For ARP, the MV of the current block is scaled according to the POC distance between the current picture and the reference picture and the POC distance between the corresponding picture and a target reference picture. The target reference picture is the picture pointed by the transmitted reference picture index for the current block or corresponding block.

Exception Handler Process 3.

The motion parameters are set to pre-defined parameters. For example, the pre-defined MV can be set to (0,0) and the pre-defined reference picture index can be set to 0 in the prediction direction (list0 or list1).

Exception Handler Process 4.

The motion vector is set to (0,0), reference index is set to the target index, and the prediction type (uni-prediction or bi-prediction) is set to the given prediction type.

Exception Handler Process 5.

The motion vector is set to (0,0), reference picture index is set to the target index, and the prediction type (uni-prediction or bi-prediction) is set to the slice type.

In the third Embodiment, only the motion vector (MV) is re-used and the reference picture index is inferred or pre-defined (e.g. the reference picture index being 0). In this case, when the picture order count (POC) of the corresponding reference picture of the corresponding block in the corresponding picture used to derive motion parameters does not match the reference picture index of current block or any reference picture in the reference picture list of the prediction direction (list0 or list1) of the current block, or when the POC of the reference picture of the current block used to derive motion parameters does not match any reference picture in the reference picture list of the corresponding block, an exception handler process can be used to overcome the reference picture index issue.

Exception Handler Process 1.

The motion parameter is set as unavailable in the prediction direction (list0 or list1). When current slice is a B slice, if only the motion parameter of one list is available, the prediction direction for current block is set to L0 or L1 according to which one is available. Otherwise, if the motion parameters of both lists are unavailable, the motion predictor is set as unavailable.

Exception Handler Process 2.

The MV of the corresponding block is scaled according to the POC distance between the current picture and a target reference picture and the POC distance between the corresponding picture used to derive motion parameter and corresponding reference picture. For ARP, the MV of the current block is scaled according to the POC distance between the current picture and the reference picture and the POC distance between the corresponding picture and a target reference picture. The target reference picture is the picture pointed by the inferred or predetermined reference picture index for the current block or corresponding block.

Exception Handler Process 3.

The motion parameters are set to pre-defined parameters. For example, the pre-defined MV can be set to (0,0) and the pre-defined reference picture index can be set to 0 in the prediction direction (list0 or list1).

Exception Handler Process 4.

The motion vector is set to (0,0), reference index is set to the target index, and the prediction type (uni-prediction or bi-prediction) is set to the given prediction type.

Exception Handler Process 5.

The motion vector is set to (0,0), reference index is set to the target index, and the prediction type (uni-prediction or bi-prediction) is set to the slice type.

In 3D-HEVC version 4.0, the MPI mode is only possible, if the whole region of the video signal that the motion data and partitioning are to be inherited from, is coded using Inter prediction and the reference indices inherited from the video signal are also available in the reference picture buffer for the depth map coding. However, syntax wise, the encoder can still signal the MPI mode ON, even though partial region is coded using Intra prediction or the reference pictures are unavailable in the reference picture buffer. In this case, inconsistency of MPI may occur due to different implementation between an encoder and a decoder. As the result, a mismatch may happen in the decoded pictures. Therefore, there is a risk that a decoder may encounter unexpected behavior by using undefined (e.g., Intra prediction) or unclear motion values (e.g., the reference pictures unavailable in the reference picture buffer).

To avoid such a mismatch due to different implementation on the undefined or unclear motion data (i.e., the undefined motion data for the Intra coded region or the reference picture not in the reference picture buffer) between an encoder and a decoder, and to prevent unexpected decoder behavior, embodiments of the present invention use predetermined motion data for the Intra coded region or the region with unavailable reference picture to eliminate undefined decoder behavior.

In the fourth Embodiment, when the MPI is enabled, the region with undefined or unclear motion data is filled up with motion vector equal to (0,0), reference index equal to 0, and prediction type (uni-prediction or bi-prediction) equal to the slice type. For regions with unclear motion data, an exception handler process can be used to overcome the reference picture index issue.

Exception Handler Process 1.

The motion parameter is set as unavailable in the prediction direction (list0 or list1). When current slice is a B slice, if only the motion parameter of one list is available, the prediction direction for current block is set to L0 or L1 according to which one is available.

Exception Handler Process 2.

The MV of the corresponding block is scaled according to the POC distance between the current picture and a target reference picture and the POC distance between the corresponding picture used to derive motion parameter and the corresponding reference picture. The target reference picture can be the first reference picture of the reference picture list of the prediction direction (list0 or list1) and the reference picture index for the current block can be set to 0. The target reference picture can also be set to any reference picture in the reference picture list or the reference picture index.

Exception Handler Process 3.

The MV of the corresponding block is scaled according to the POC distance between the current picture and the target reference picture and the POC distance between the corresponding picture used to derive motion parameter and the corresponding reference picture. The target reference picture is set as the reference picture used by a spatial neighboring block of the prediction direction (list0 or list1) and the reference picture index for current block is set to that used by the spatial neighboring block.

Exception Handler Process 4.

The motion parameters are set to pre-defined parameters. For example, the pre-defined MV can be set to (0,0) and the pre-defined reference picture index can be set to 0 in the prediction direction (list0 or list1).

Exception Handler Process 5.

The motion vector is set to (0,0), reference index is set to 0, and the prediction type (uni-prediction or bi-prediction) is set to the slice type.

In the previous disclosure, the corresponding reference picture has the same picture order count (POC) as the reference picture pointed by the corresponding block, so POC of the reference picture is checked with the reference picture list of the current block to determine if the corresponding reference picture is in the reference picture list or reference picture buffer. In some other embodiments, view index (i.e. view id) in case of three-dimensional or multi-view video coding system or layer index (i.e. layer id) in case of scalable video coding system can also be checked.

Figure 7:
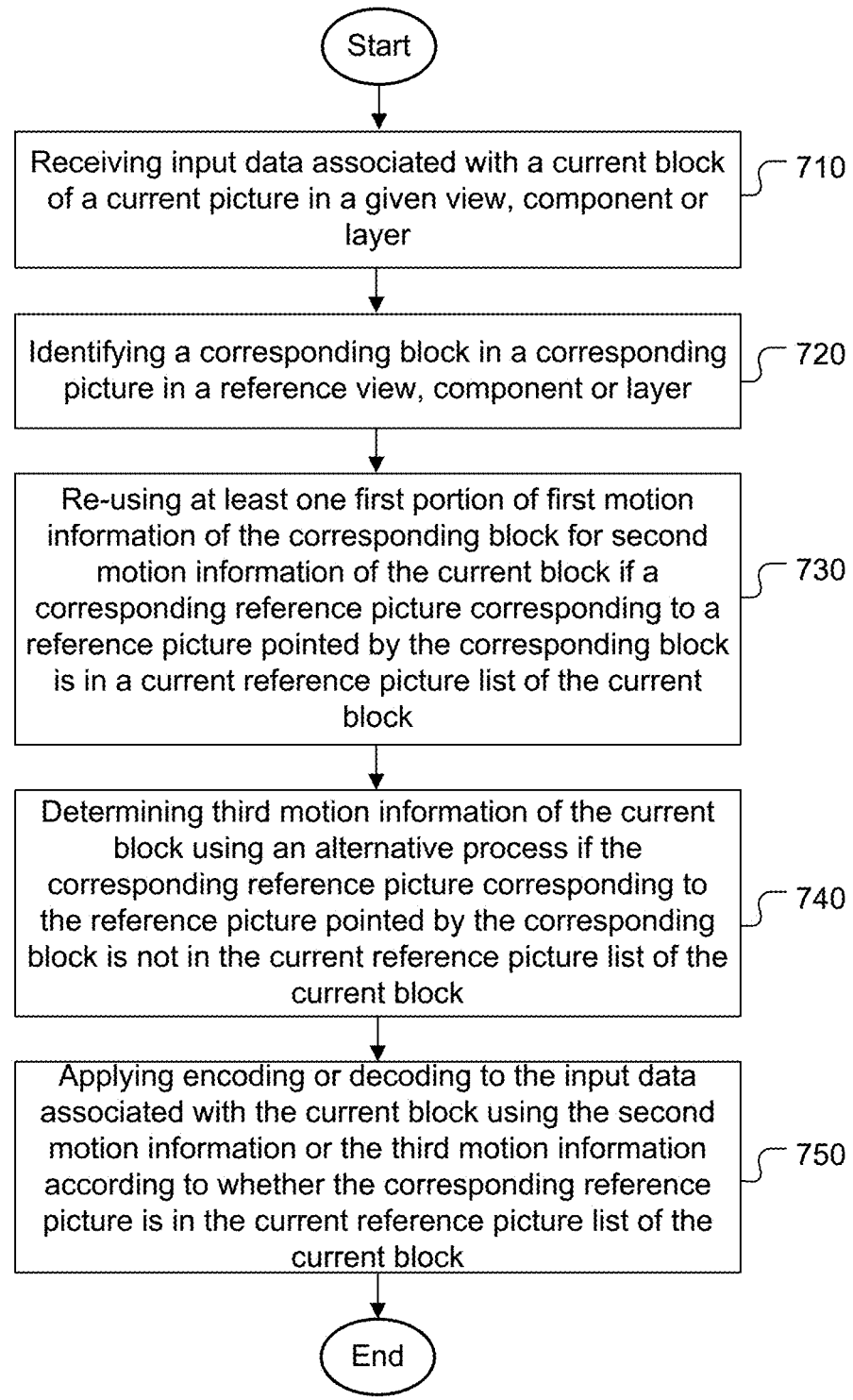
FIG. 7 illustrates an exemplary flowchart for a system incorporating motion information prediction and inheritance according to an embodiment of the present invention.

FIG. 7 illustrates an exemplary flowchart for a three-dimensional, multi-view or scalable video coding system according to an embodiment of the present invention. The system receives input data associated with a current block of a current picture in a given view, component or layer in step 710. The input data may correspond to un-coded or coded texture data, depth data, or associated motion information. The input data may be retrieved from storage such as a computer memory, buffer (RAM or DRAM) or other media. The input data may also be received from a processor such as a controller, a central processing unit, a digital signal processor or electronic circuits that derives the input data. A corresponding block in a corresponding picture in a reference view, component or layer is identified as shown in step 720. At least one first portion of first motion information of the corresponding block is re-used as second motion information of the current block if a corresponding reference picture corresponding to a reference picture pointed by the corresponding block is in a current reference picture list of the current block as shown in step 730. The third motion information of the current block is determined using an alternative process if the corresponding reference picture corresponding to the reference picture pointed by the corresponding block is not in the current reference picture list of the current block as shown in step 740. Encoding or decoding is then applied to the input data associated with the current block using the second motion information or the third motion information according to whether the corresponding reference picture is in the current reference picture list of the current block as shown in step 750.

The flowchart shown above is intended to illustrate an example of a three-dimensional, multi-view or scalable video coding system incorporating an embodiment of the present invention. A person skilled in the art may modify each step, re-arranges the steps, split a step, or combine steps to practice the present invention without departing from the spirit of the present invention. For example, step 730 may be modified so that at least one first portion of first motion information of the current block is re-used as second motion information of the corresponding block if a corresponding reference picture corresponding to a reference picture pointed by the corresponding block is in a current reference picture list of the current block; and step 740 may be modified so that the third motion information of the corresponding block is determined using an alternative process if the corresponding reference picture corresponding to the reference picture pointed by the corresponding block is not in the current reference picture list of the current block.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for motion information prediction and inheritance in a three-dimensional, multi-view or scalable video coding system, the method comprising:
   receiving input data associated with a current block of a current picture in a given view, component or layer;
   identifying a corresponding block in a corresponding picture in a reference view, component or layer;
   re-using at least one first portion of first motion information of the corresponding block for second motion information of the current block if a corresponding reference picture corresponding to a reference picture pointed by the corresponding block is in a current reference picture list of the current block;

determining third motion information of the current block using an alternative process if the corresponding reference picture corresponding to the reference picture pointed by the corresponding block is not in the current reference picture list of the current block; and applying encoding or decoding to the input data associated with the current block using the second motion information or the third motion information according to whether the corresponding reference picture is in the current reference picture list of the current block.

2. The method for claim 1, wherein the corresponding reference picture has the same picture order count (POC) as the reference picture pointed by the corresponding block.

3. The method for claim 1, wherein said at least one first portion of the first motion information of the corresponding block comprises a motion vector, reference picture index, or prediction direction of the corresponding block, or any combination thereof.

4. The method for claim 1, wherein said at least one first portion of the first motion information of the corresponding block only includes motion vector of the corresponding block and reference picture index of the current block is inferred or predefined, or is signaled in a bitstream.

5. The method for claim 1, wherein the alternative process sets the third motion information of the current block as unavailable in a first prediction direction if the corresponding reference picture is not in the current reference picture list of the current block in the first prediction direction.

6. The method for claim 5, wherein if the current block is in a B slice and the corresponding reference picture is available in the current reference picture list of the current block only for the first prediction direction, the alternative process sets the third motion information of the current block to the first prediction direction; and if the current block is in the B slice and the corresponding reference picture is not in the current reference picture list of the current block in the first prediction direction and second prediction direction, the alternative process sets the third motion information of the current block as unavailable for both the first prediction direction and the second prediction direction.

7. The method for claim 1, wherein a motion vector of the corresponding block is scaled to a scaled motion vector according to a first distance between the current picture and a target reference picture and a second distance between the corresponding picture and the reference picture; and wherein the alternative process uses the scaled motion vector for the current block.

8. The method for claim 7, wherein the target reference picture corresponds to a first reference picture at first position of the current reference picture list in a prediction direction; and wherein reference picture index of the current block is set to 0.

9. The method for claim 7, wherein the target reference picture is set to a first reference picture of a spatial neighboring block of the current block; and wherein reference picture index of the current block is set to a first reference picture index of the spatial neighboring block.

10. The method for claim 7, wherein the target reference picture is identified by reference picture index of the current block; and wherein the reference picture index of the current block is signaled in a bitstream, or the reference picture index of the current block is inferred or pre-defined.

11. The method for claim 1, wherein the alternative process sets the third motion information to pre-defined parameters.

12. The method for claim 11, wherein motion vector of the current block is set to (0,0) and reference picture index of the current block is set to 0 in a prediction direction.

13. The method for claim 1, wherein when motion parameter inheritance (MPI) is enabled for the three-dimensional video coding system, the alternative process sets motion vector of the current block to (0,0), sets reference picture index of the current block to 0, and sets prediction direction of the current block to first prediction direction indicated by slice type if the first motion information of the corresponding block is undefined or unclear.

14. The method for claim 1, wherein at least one second portion of said at least one first portion of the first motion information is not re-used for the third motion information according to the alternative process.

15. The method for claim 1, wherein the corresponding reference picture has the same view index or layer index as the reference picture pointed by the corresponding block.

16. An apparatus for motion information prediction and inheritance in a three-dimensional, multi-view or scalable video coding system, the apparatus comprising electronic circuits, wherein the electronic circuits are configured to:
receive input data associated with a current block of a current picture in a given view, component or layer;
identify a corresponding block in a corresponding picture in a reference view, component or layer;
re-use at least one first portion of first motion information of the corresponding block for second motion information of the current block if a corresponding reference picture corresponding to a reference picture pointed by the corresponding block is in a current reference picture list of the current block;
determine third motion information of the current block using an alternative process if the corresponding reference picture corresponding to the reference picture pointed by the corresponding block is not in the current reference picture list of the current block; and
apply encoding or decoding to the input data associated with the current block using the second motion information or the third motion information according to whether the corresponding reference picture is in the current reference picture list of the current block.

17. A method for motion information prediction and inheritance in a three-dimensional, multi-view or scalable video coding system, the method comprising:
receiving input data associated with a current block of a current picture in a given view, component or layer;
identifying a corresponding block in a corresponding picture in a reference view, component or layer;
re-using at least one first portion of first motion information of the current block for second motion information of the corresponding block if a corresponding reference picture corresponding to a reference picture pointed by the current block is in a corresponding reference picture list of the corresponding block;
determining third motion information of the corresponding block using an alternative process if the corresponding reference picture corresponding to the reference picture pointed by the current block is not in the corresponding reference picture list of the corresponding block; and
applying motion information prediction and inheritance to the corresponding block using the second motion information or the third motion information according to whether the corresponding reference picture is in the corresponding reference picture list of the corresponding block.

18. The method for claim 17, wherein the corresponding reference picture has the same picture order count (POC) as the reference picture pointed by the current block.

19. The method for claim 17, wherein a motion vector of the current block is scaled to a scaled motion vector according to a first distance between the current picture and the reference picture and a second distance between the corresponding picture and a target reference picture; and wherein the alternative process uses the scaled motion vector for the current block.

20. The method for claim 19, wherein the motion vector of the current block is scaled to a first reference picture at first position of the corresponding reference picture list, and reference picture index of the corresponding block is set to 0.

21. The method for claim 19, wherein the target reference picture is identified by reference picture index of the corresponding block; and wherein the reference picture index of the corresponding block is signaled in a bitstream, or the reference picture index of the corresponding block is inferred or pre-defined.

22. The method for claim 17, wherein the alternative process sets the third motion information to pre-defined parameters.

23. The method for claim 17, wherein at least one second portion of said at least one first portion of the first motion information is not re-used for the third motion information according to the alternative process.

24. The method for claim 17, wherein the corresponding reference picture has the same view index or layer index as the reference picture pointed by the current block.

* * * * *